US008543522B2

(12) United States Patent  (10) Patent No.: US 8,543,522 B2
Ryman-Tubb et al.  (45) Date of Patent: Sep. 24, 2013

(54) AUTOMATIC RULE DISCOVERY FROM LARGE-SCALE DATASETS TO DETECT PAYMENT CARD FRAUD USING CLASSIFIERS

(75) Inventors: Nick F. Ryman-Tubb, Surrey (GB); Bernard Chartier, Providence, RI (US)

(73) Assignee: Retail Decisions, Inc., Edison, NJ (US)

( * ) Notice: Subject to any disclaimer, the term of this patent is extended or adjusted under 35 U.S.C. 154(b) by 270 days.

(21) Appl. No.: 13/088,651

(22) Filed: Apr. 18, 2011

(65) Prior Publication Data
US 2011/0264612 A1    Oct. 27, 2011

Related U.S. Application Data

(60) Provisional application No. 61/326,452, filed on Apr. 21, 2010.

(51) Int. Cl.
*G06F 15/18* (2006.01)

(52) U.S. Cl.
USPC .......................................................... 706/12

(58) Field of Classification Search
None
See application file for complete search history.

(56) References Cited

U.S. PATENT DOCUMENTS

| | | | |
|---|---|---|---|
| 6,067,535 A | 5/2000 | Hobson | |
| 6,163,604 A | 12/2000 | Baulier | |
| 7,433,855 B2 | 10/2008 | Gavan | |
| 7,627,543 B2 | 12/2009 | Lock et al. | |
| 2003/0110385 A1 | 6/2003 | Golobrodsky | |
| 2009/0327197 A1* | 12/2009 | Tuzhilin et al. | 706/47 |

OTHER PUBLICATIONS

Zeng et al. "Learning Finite State Machines With Self-Clustering Recurrent Networks", Neural Computing, 5, 1993, pp. 976-990.*
Chiu "Fuzzy Model Identification Based on Cluster Estimation". J. IFS, vol. 2, 1994, pp. 267-278.*
Dougherty et al. "Supervised and Unsupervised Discretization of Continuous Features", Proc. ML, 1995, pp. 9.*
International Search Report, Received Dec. 22, 2011.

* cited by examiner

*Primary Examiner* — Li-Wu Chang
(74) *Attorney, Agent, or Firm* — Greenberg Traurig LLP (57) ABSTRACT

A set of payment card transactions including a sparse set of fraudulent transactions is normalized, such that continuously valued literals in each of the set of transactions are transformed to discrete literals. The normalized transactions are used to train a classifier, such as a neural network, such that the classifier is trained to classify transactions as fraudulent or genuine. The fraudulent transactions in the set of payment card transactions are clustered to form a set of prototype transactions. Each of the discrete literals in each of the prototype transactions is expanded using sensitivity analysis using the trained classifier as an oracle, and a rule for identifying fraudulent transactions is generated for each prototype transaction based on the transaction's respective expanded literals.

18 Claims, 7 Drawing Sheets

```
Cluster
Input: Fraud dataset t; (i>0)
Output: Clusters, weights
    1.  let weighs=t;
    2.  let Cluster=1
    3.  for each t;
    4.      calculate Euclidean_distance(t;, weights)
    5.      let closest=0
    6.      for each cluster
    7.          if distance_cluster <=threshold then closest=cluster
    8.      if closest >0 then update_weights(weights, t;,closest)
    9.      else form_new_cluster(weights, t;,closest)
    10. return: Cluster, weights Form_new_cluster
Input: Fraud cases (weights, t;, closest)
    1.  let Cluster = Cluster + 1
    2.  weights_cluster,closest= t;

Update_weights
Input: Fraud cases (weights, t;, closest)
    1.  weights_cluster,closest= t;
```

FIG. 4

Sensitivity

Input: Prototype $P_i$, Fraud Threshold
Output: Rule(s) r 1. initialise Rule r=[ ], Antecedent a=[ ], upper bound u=0, lower bound l=max-value, Number rules c=0
2. for each Literal $L_k$ in $P_i$
3.    if ($L_k$ is a Discrete Literal) then
4.      Rule r':=outlier(Prototype $P_i$, literal $L_k$, Fraud Threshold)
5.      for each m (m>0)  \\ m is number of binary digits in $L_k$
6.        let New Centroid : = $P_i$ with Discrete Literal L= {($b_1,...,b_m$}, $j$=1
7.        score: = QueryNeuralOracle (New Centroid)
8.        If (score >= Fraud Threshold) then
9.          let lower bound l: =min(l, $L_m$)
10.          let upper bound u:= max(u, $L_m$)
11.          let fired : = true
12.        else if (fired :=true)
13.          a=Generate-antecedent(L, Antecedent a, l, u, r', c)
14.          let fired : = false
15.          let u=0, l=max-value
16.      \\ end for each binary digit m
17.      if (fired :=true) Generate-antecedent(L, a, l, u, r', c) \\generate final part of the antecedent
18.    else \\ type is discreet symbolic
19.      if ($L_m$: = true) then a=L → Fraud
20.    return: r Generate-antecedent
Input: Discrete Literal L, Antecedent a, lower bound l, upper bound u, Rule r', Number rules c 1.    if r'≠[] then $r_c$=a ∧ r' → Fraud, c=c+1
2.    else $r_c$=a ∧ (l≤L≤u) ) → Fraud, c=c+1

FIG. 5

Outlier

Input: Prototype $P_i$, Discrete Literal $L$ where $L=\{b_1,b_2,...b_q\}$, Fraud Threshold
Output: Rule $r'$ 1. initialise Rule $r'=[\ ]$
2. let New Centroid := Prototype $P_i$ with Discrete Literal $L\ \{b_1,b_2,...b_q\}=0$
3. score: = QueryNeuralOracle(*New Centroid*)
4. if score >= Fraud Threshold then
5. generate Rule $r':=\neg\ (l_i\leq L\leq u_i)\ \wedge \rightarrow$ Fraud
6. return: $r'$

AUTOMATIC RULE DISCOVERY FROM LARGE-SCALE DATASETS TO DETECT PAYMENT CARD FRAUD USING CLASSIFIERS

The present application claims the benefit of Provisional U.S. Patent Application Ser. No. 61/326,452, filed on Apr. 21, 2010, the disclosure of which is hereby incorporated by reference in its entirety.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The instant disclosure relates to the field of automated fraud detection and more particularly, to automated fraud detection using classifiers capable of separating non-linear classes and rule-based expert systems.

BACKGROUND OF THE INVENTION

Fraud is prevalent in many high-volume areas, such as on-line shopping, telecommunications, banking, social security claims, etc., where a manual review of all transactions is not possible and decisions must be made quickly to prevent crime. Fraud is increasing with the expansion of computing technology and globalization, with criminals devising new frauds to overcome the strategies already in place to stop them. Fraud detection can be automated through the through the use of a Fraud Management System (FMS). In various embodiments, an FMS can comprise a rule-based expert system that stores and uses knowledge in a transparent way that is straightforward for a fraud expert to modify and interpret.

Classifiers, such as neural networks, can be trained to recognize fraudulent transactions, such as transactions relating to payment cards, for example, credit and debit cards, gift cards, top-up cards, fuel cards, and various types of pre-paid cards. A classifier trained to recognize fraudulent transactions contains information about patterns in fraudulent transactions that may be helpful to human experts in understanding payment card fraud. Such information can be extracted as human readable rules using various techniques. One such technique is a decompositional approach, where rules are created using heuristic searches that guide the process of rule extraction. This method works by decomposing the classifier architecture and therefore produces rules that represent the internal architecture. Another such technique is a pedagogical approach, such as disclosed below, where a set of global rules are extracted from the classifier in terms of the relationships between only the inputs and the outputs. These individual rules are then combined into a set of rules that describes the classifier as a whole.

BRIEF DESCRIPTION OF THE DRAWINGS

The foregoing and other objects, features, and advantages of the invention will be apparent from the following more particular description of preferred embodiments as illustrated in the accompanying drawings. The drawings are not necessarily to scale, emphasis instead being placed upon illustrating principles of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Reference will now be made in detail to embodiments of the disclosed system and method to automate the creation of rules from large transaction datasets. In one embodiment, a classifier, such as, for example, a neural network is used to learn relationships in the data and rules are then extracted from the trained classifier. The embodiments described below are discussed in relation to systems and methods for analyzing payment card data and extracting rules relating, inter alia, to fraudulent payment card transactions. It should be understood that the disclosed systems and methods can be used for generating rules relating to any type of pattern in input datasets that can be classified using a classifier capable of separating non-linear classes including, but not limited to, neural network.

Figure 1:
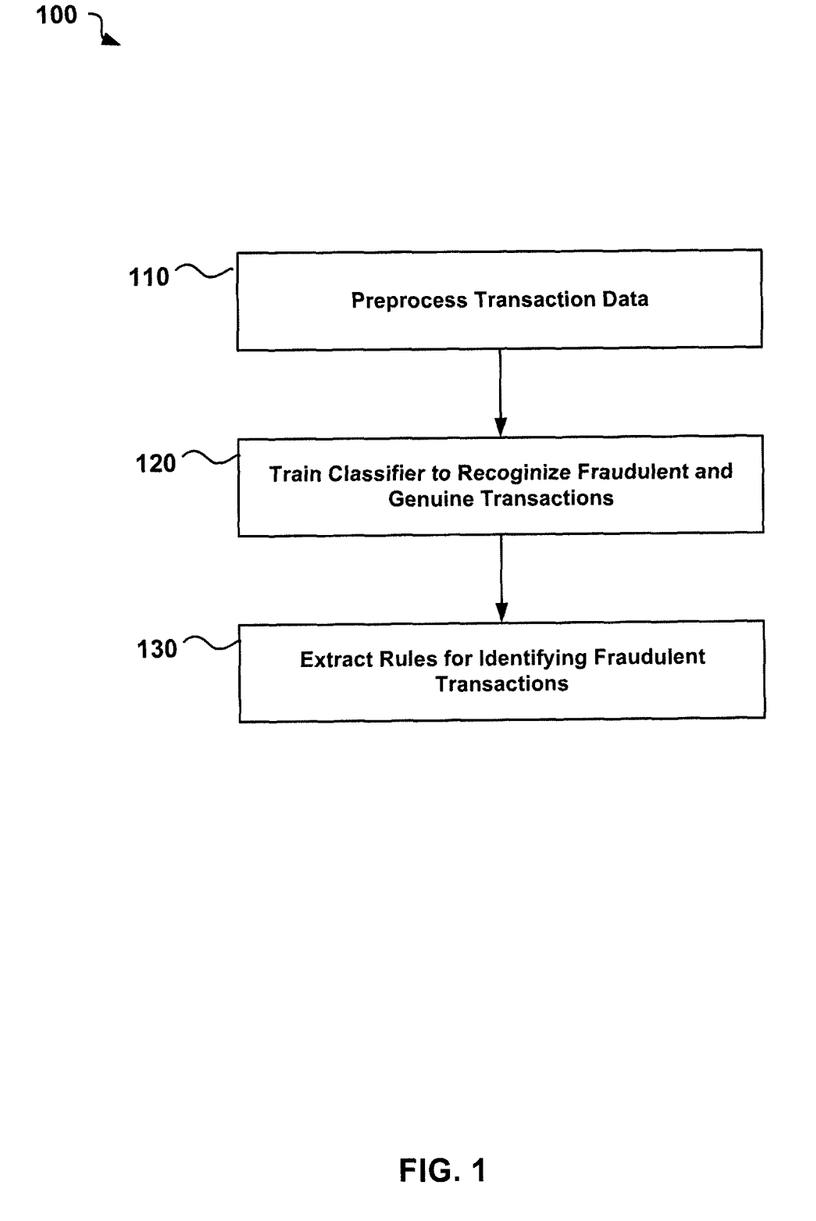
FIG. 1 illustrates a high-level overview of one embodiment of a process 100 for generating rules from a classifier that can help detect, explain or describe patterns in fraudulent payment card transactions.

FIG. 1 illustrates a high-level overview of one embodiment of a process 100 for generating rules that can help detect, explain or describe patterns in fraudulent payment card transactions.

In block 110, a dataset comprising a set of payment transactions, including fraudulent and genuine transactions, are preprocessed to normalize this data and convert it to a suitable numerical representation for training a two class classifier (e.g. fraudulent and genuine classes). In block 120 a supervised-learning classifier, such as a neural network, is trained to recognize at least one class of fraudulent transactions using a set of transactions selected from the normalized data. In block 130, a rule set for identifying fraudulent transactions is then extracted from the trained classifier using techniques as described in detail below with respect to FIG. 3. The resulting rules could then be used, for example, by fraud analysts to detect patterns and trends in fraudulent transactions, or additionally or alternatively, be input to a rule based Fraud Management System (FMS) for detecting fraudulent transactions in real-time (with or without modification by, for example, fraud analysts).

Figure 2:
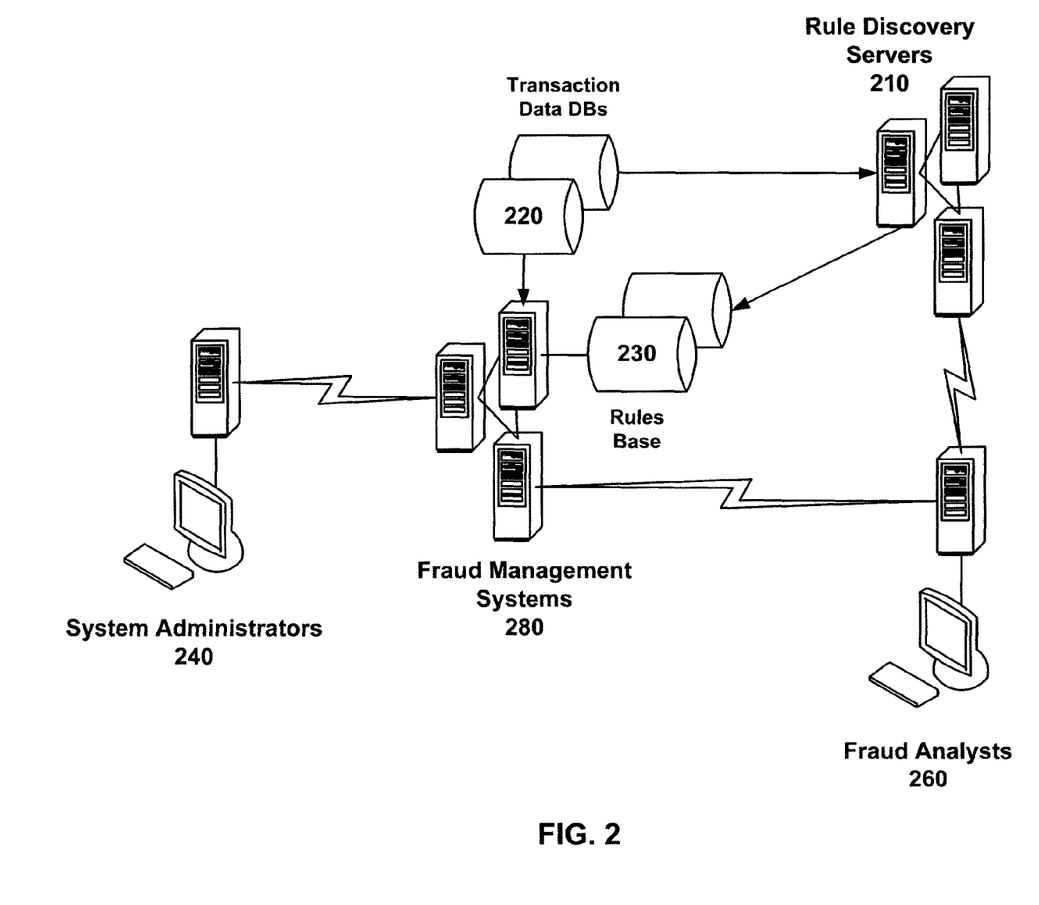
FIG. 2 illustrates a high-level overview of one embodiment of a system 100 capable of supporting the process shown in FIG. 1.

FIG. 2 illustrates a high-level overview of one embodiment of a system 100 capable of supporting the process shown in FIG. 1.

One or more rule discovery servers 210 provide various functions supporting the processes described herein. Such functions can include normalizing transaction data, training neural networks and/or any other type of classifier based on supervised learning algorithms, and extracting rule sets from trained classifiers. The system can maintain one or more databases for storing transaction data 220, which could include raw and/or normalized transaction data and training transaction datasets which could comprise a subset of one or more normalized training datasets. Transaction data included in the transaction datasets could include payment card transactions including fraudulent transactions. The system could additionally maintain one or more process extracted rules databases 230 for rules extracted from trained classifiers.

In one embodiment, the processes operating on the rule discovery servers 210 can be controlled by one or more system administrators 240 connected to the servers 210 via a network, such as a private LAN or WAN, or a public network, such as the Internet. In one embodiment, extracted rules stored on the extracted rules databases 230 can be viewed and/or edited by fraud analysts (and other interested users) 260 connected to the rule discovery servers via a network, such as a private LAN or WAN, or a public network, such as the Internet. In one embodiment, extracted rules stored on the extracted rules databases 230 could be input to one or more Fraud Management Systems (FMS) for detection of fraudulent transactions in real-time or in batches of previously processed transactions.

Note that the various components described above could exist in one organization, or could be scattered across multiple organizations. For example, transaction databases 220 could be maintained by an organization, such as a bank or transaction clearing house, remote from the rule discovery servers 210, and fraud analysts 260 could be employed by a second organization remote from both the rule discovery servers 210 and the transaction databases 220.

Figure 3:
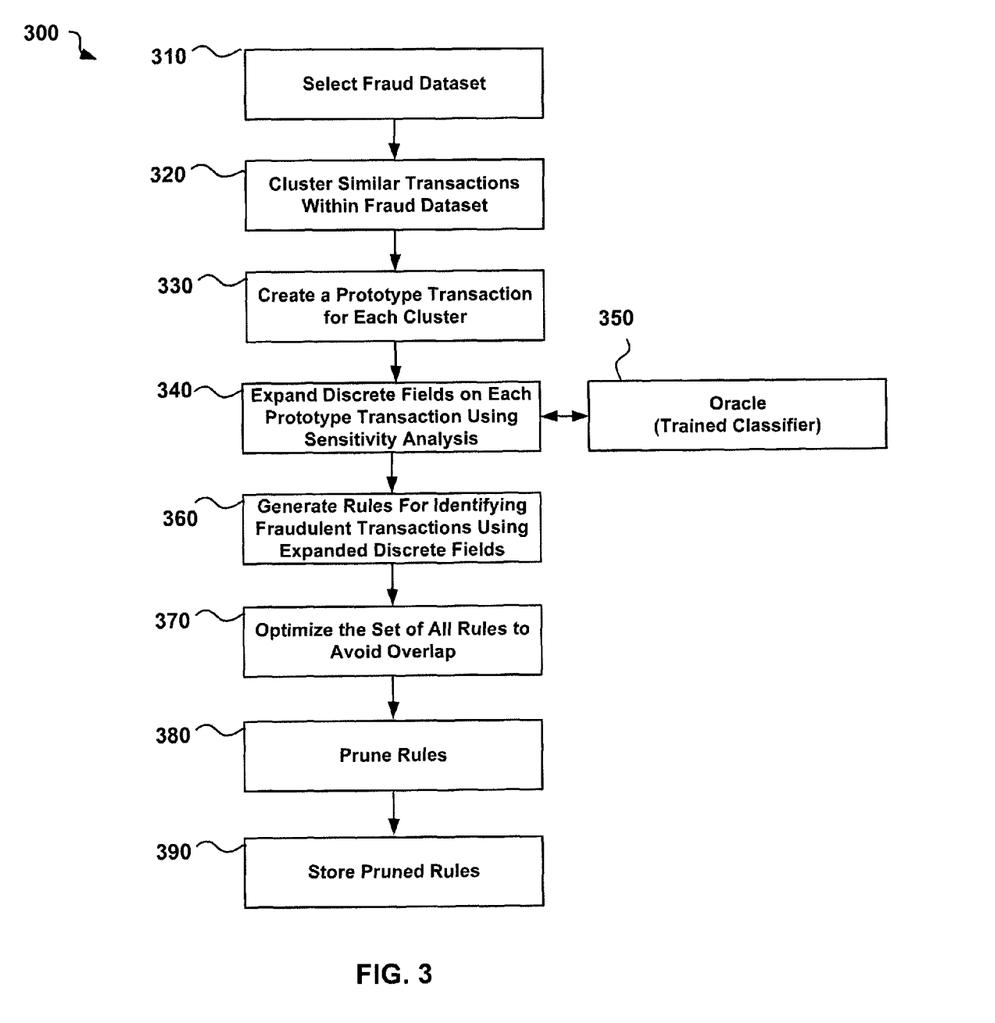
FIG. 3 illustrates one embodiment of a process for rule extraction from a classifier which utilizes sensitivity analysis based on decision boundary analysis.

In one embodiment, the processes described in this disclosure, such as those illustrated in FIG. 1 and FIG. 3, can be implemented on one or more rule discovery servers 210 as any combination or hardware or software components. Individual servers or clusters of servers may support single functions (e.g., normalizing data, hosting or training classifiers, etc.) or may host some or all of the functions described herein.

FIG. 2 is purely illustrative, and other combinations of hardware, software and network elements are capable of providing similar or identical functions, as will be readily apparent to those skilled in the art.

Referring back to FIG. 1, with respect to block 110, in one embodiment, the payment transaction dataset comprises a real-world dataset comprising a set of payment transactions with a number of literals and a sparse fraud class. In one embodiment, data preprocessing includes data normalization processes comprising any combination of operations including, but not limited to:

checking all records for incomplete or missing data;
attempting to identify outliers in the data and to make decisions if as to whether such records should be used for training classifiers;
assessing the relevance of each field to ensure maximum entropy based on, for example Shannon's Information Theory (Shannon, 1948);

identifying redundancy in the data using linear correlation;
creating frequency histograms of numeric data to ascertain which variables could benefit from transformation; and/or
performing frequency analysis of symbolic fields to ascertain which low frequency fields could benefit from being grouped; re-weighting and splitting.

The above operations are illustrative, and not limiting, and other types of data normalization may be used without departing from the spirit and the scope of the invention.

In some embodiments, during the data normalization process, continuous-valued literals in the input transaction file are converted into discrete literals (i.e., a series of binary fields). Converting continuous literals into discrete literals can be useful, for example, to simplify rules extracted from a classifier trained with such data.

In one embodiment, a literal is a single field L from an input i, where $i=\{L_1, L_2, \ldots L_i,\}$ each representing a concept. For continuous real world values, $L_i=[0, 1]$, and for a single symbol $L_i=\{0, 1\}$. In one embodiment, a discrete literal is a continuous real world value that is quantized into a series of exclusive bins where the corresponding real value is $\{[l_1, u_1], [l_2, u_2], \ldots [l_m, u_m]\}$, where $l_i < u_i$, and $l_1 < l_2 < l_m$ and $u_i < u_2 < u_m$ and each bin is represented by a binary digit, $L_i=\{b_1, b_2, \ldots b_m\}$. The discretised literal consists of m binary digits where each $b_i$, is set to 1 for the corresponding range, that is, $\{1, 0, \ldots 0\}, \{0, 1, \ldots 0\}$ until $\{0, 0, \ldots 1\}$, shown as $(\{b_1, b_2, \ldots b_m\}, \oplus)$. Here, $\{b_1, b_2, \ldots b_m\} \equiv \{[l_1, u_1], [l_2, u_2], \ldots, [l_m, u_m]\}$.

In one embodiment, each continuous literal in the transaction dataset can be clustered using unsupervised clustering techniques that develop new clusters as required when sufficiently different patterns in a particular field are identified. In one embodiment, the clustering algorithm calculates the Euclidean distances between an input pattern and exemplars to determine cluster membership. Where a pattern lies outside the radii of a hypersphere set by a user-defined parameter (e.g., a threshold Euclidean distance), a new cluster is formed. In one embodiment, this type of algorithm can be implemented so that only clusters with sufficient number of members are formed. Those with few members can be combined with the nearest cluster. The center of each cluster is then used to define the start of a range, so that "bins" are formed.

With respect to block 120 of FIG. 1, in one embodiment, the supervised-learning classifier is trained to recognize at least one class of fraudulent transactions and one class of genuine transactions using a training dataset. In one embodiment the training dataset, s, is a subset of examples from the transaction dataset normalized in block 110 of FIG. 1, where the training dataset is in the form of a vector (i, c), where i is the input value to the classifier and c is the target class label, for example, c could comprise a set of two class labels c={genuine, fraud}. Alternatively, the class labels could comprise a set of class labels reflecting different categories of genuine and fraudulent transactions. For example, fraudulent transactions could be classified as collusion-type fraudulent transactions (collusion between a merchant and a cardholder), Cardholder Present (CP) fraudulent transactions, and Cardholder Not Present (CNP) fraudulent transactions.

In one embodiment, the training dataset, s, could comprise the entire normalized transaction dataset. In one embodiment, the training dataset, s, could comprise a subset of the entire normalized transaction dataset, for example, a subset sampled randomly from the set of all transactions.

The classifier trained with the training dataset could be any type of supervised-learning classifier now known, or later developed in the art. Such supervised learning classifiers could include, for example, classifiers implemented using various types of neural network methodologies such as, for example, multi-layer perceptrons. Such supervised learning classifiers could additionally include non-neural network classification techniques, for example, Support Vector Machines (SVMs), linear regression, logistic regression, and nearest neighbor methods.

With respect to neural network classifiers, supervised neural networks commonly used in practice have a three-layer, feed-forward structure, where neurons in one layer are connected to the neurons in the preceding layer. It has been proven that a three-layer neural network structure, using sigmoidal or Gaussian functions, is capable of approximating any Borel measurable function from one finite topological space to another to any degree of accuracy provided that there is sufficient number of hidden neurons. The three-layer structure can include an input layer, a hidden layer, and an output layer, as follows:

1. Input layer (i)=$(i_1, i_2, \ldots, i_n)$
2. Hidden layer (h)=$(h_1, h_2, \ldots, h_n)$
3. Output layer (o)=$(o_1, o_2, \ldots, o_n)$ This type of neural network is commonly referred to as a multi-layer perceptron (MLP). In one embodiment, a three-layer neural network can be made with real-valued parameters being the weights of the connections between all the neurons $w_{hi}$ and $w_{ho}$ and the neuron biases $\theta_{hi}$ and $\theta_{ho}$. The input to a single $j^{th}$ neuron in the h layer is given by the function, $net_h = \Sigma w_{hi} o_j$, and respectively the o layer is given by $net_o = \Sigma w_{ho} o_j$. The output is $o_j = f(net_j)$, where f is the activation function. These two functions together make up the neuron transfer function.

In some embodiments, neural networks can use a use a sigmoidal activation function, so that, $$o_j = \frac{1}{1 + e^{-(net_j/\theta_o)}}$$

where $\theta_o$ determines the slope of the function around the linear section and values in the network have the range [0, 1]. There are also other activation functions, such as the arcus tangent, $$o_j = \frac{1 - e^{-(net_j/\theta_o)}}{1 + e^{-(net_j/\theta_o)}}$$

In this case, values in the network have the range [−1, 1]. The choice of the transfer function affects the performance of the neural network and any classifiers built using them.

There are a number of different algorithms that can be used to train a supervised neural network given examples of each class, such as {fraud, genuine}. These training algorithms are all trying to optimize a nonlinear objective function. There is no single best method for nonlinear optimization. For the typical MLP described, this objective function could include, for example, an error function such as the error E between the outputs generated $o_i$ and the outputs required $y_i$, $E = \frac{1}{2} \Sigma_i (y_i - o_i)$. Common training algorithms could include the Conjugate Gradient Decent method, quasi-Newton algorithms or various Levenberg-Marquardt algorithms. All algorithms aim to globally minimize the objective function, in this case the error E.

The above techniques for implementing a neural network based classifier as a three layer MLP are purely illustrative, and those skilled in the art will appreciate that other techniques exist for implementing a supervised learning classifier using neural network techniques.

With respect to block 130 of FIG. 1, in various embodiments, rules can be extracted from the trained classifier using decompositional or pedagogical approaches to rule extraction. In at least one embodiment, a pedagogical approach could include sensitivity analysis for decision boundary analysis. FIG. 3 illustrates one embodiment of a process 300 for rule extraction from a classifier which utilizes sensitivity analysis in decision boundary analysis. Definitions applicable to FIG. 3 and the discussion below are as follows.

In block 310, a fraud dataset comprising a plurality of transactions is selected. In block 320, similar transactions within the fraud dataset are clustered. In block 330, prototype transactions are derived from the clustered transactions, such prototype transactions being the center of the cluster. In block 340, the discrete fields in each prototype transaction are expanded using sensitivity analysis utilizing a trained classifier 350 as an oracle to score expanded transactions as fraudulent or non-fraudulent. In block 360, at least one rule for identifying fraudulent transactions is generated for each prototype transaction using the expanded discrete fields for the respective prototype transaction. In block 370, the set of all rules is optimized to avoid overlap between rules. In block 380, the set of optimized rules is pruned to remove rules that have one or more undesirable properties so that the detection of fraud is improved. In block 390, the pruned set of rules is stored, for example, for future review by fraud analysts or use by an FMS.

With respect to block 310 of FIG. 3, in one embodiment, the fraud dataset is selected from a training dataset s used to train the classifier oracle in block 350 of process 300 of FIG. 3. In one embodiment, the fraud dataset is a list of vectors t of all the fraud cases in the training dataset, such that t∈s∩ fraud. If the fraud dataset includes continuous literals, the continuous literals are converted to discrete literals, for example, using the clustering techniques as described above with reference to block 110 of FIG. 1. If the rule extraction data is selected from a training dataset that was previously normalized, such an operation may not be required.

Figure 4:
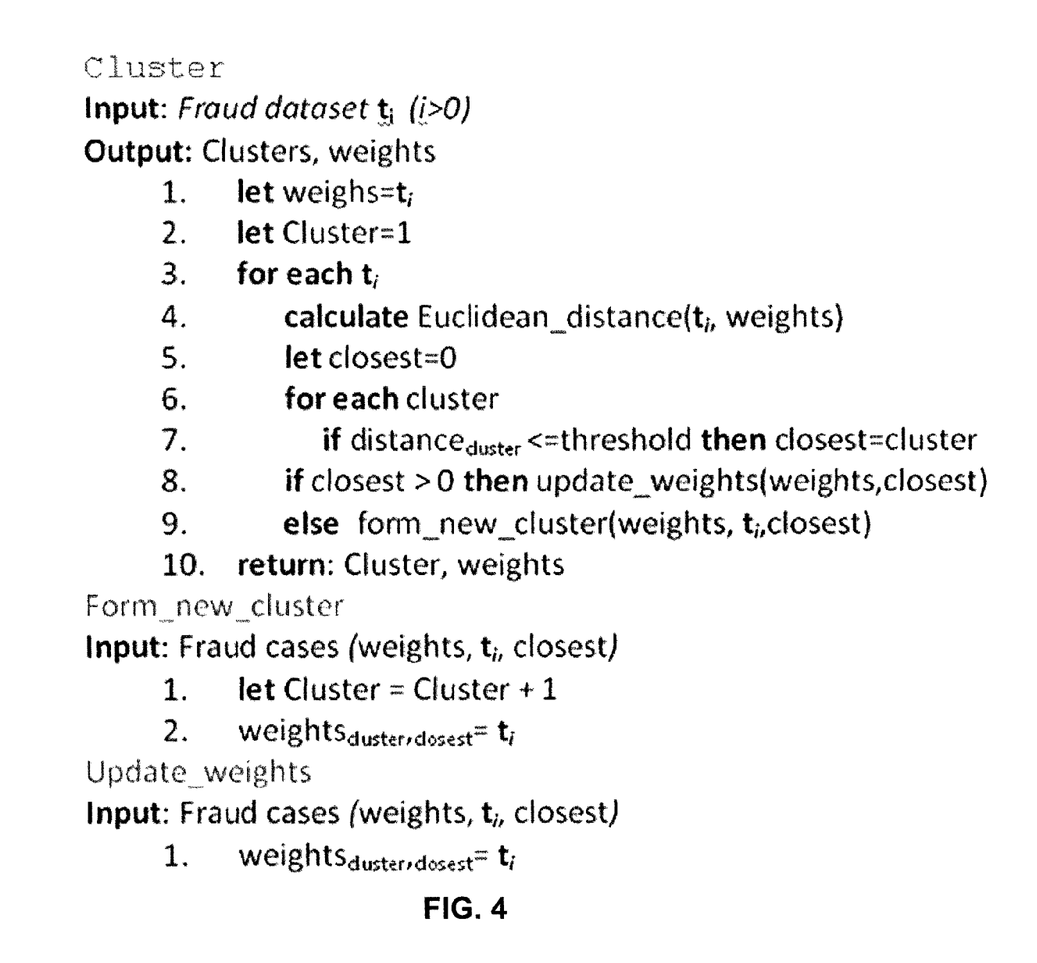
FIG. 4 illustrates one embodiment of a clustering algorithm that creates a new cluster when the Euclidean distance between an input transaction and all existing cluster exemplars fails to meet a user defined threshold.

With respect to block 320 of FIG. 3, in one embodiment, similar transactions in the fraud dataset t are clustered on patterns detected in such transactions. In one embodiment, the fraud dataset t can be clustered using an algorithm of the form shown in FIG. 4. In one embodiment, the clustering algorithm assigns individual transactions $t_i$ to of one of a set of clusters $C_i$ by calculating the Euclidean distances between the input pattern of the transaction $t_i$ and cluster exemplars (i.e., transactions already added to the cluster). The clustering algorithm shown in FIG. 4 creates a new cluster when the Euclidean distance between an input transaction $t_i$ and all existing cluster exemplars fails to meet a user-defined threshold. In one embodiment, the clustering algorithm shown in FIG. 4 begins with no clusters, and dynamically builds a set of one to many clusters, depending on the content of the fraud dataset t and the user-defined threshold.

With respect to block 330 of FIG. 3, a prototype transaction, $P_i$, is derived from each cluster of transactions $C_i$. In one embodiment, a prototype transaction $P_i$ for a cluster $C_i$ is derived by calculating a mean value for each literal $L_k$ in the transactions in the cluster $C_i$, for example, using the algorithm shown in FIG. 5, so that a new centroid is produced with the average lower and upper bounds for all exemplars in the cluster $C_i$, i.e., $P_i = \{[A_{1l}, A_{1u}], [A_{2l}, A_{2u}], \ldots [A_{ml}, A_{mu}]\}$.

With respect to block 340 of FIG. 3, sensitivity analysis utilizing a classifier oracle 350 is used to expand discrete literals in the prototype transactions. In one embodiment, the discrete literals are expanded by searching for points on the decision boundary for each discrete literal that represents fraud and forming a hyper-polytope that contains only one class, capturing the generalization of the classifier, while covering as much of the contiguous feature space as possible. This is then used to create a rule as a list of antecedents comprising a combination of the expanded input fields.

In one embodiment, the classifier 350 used in the sensitivity analysis has been trained to classify transactions in at least one of two classes {fraud, genuine}. In one embodiment, the transactions used to train the classifier is the training dataset s from which the fraud dataset t was selected. In other embodiments, the classifier could be trained using a set of transactions which includes at least some fraud cases, but does not include transactions from datasets s or t. In one embodiment, the classifier oracle is a neural network, which could be of any form, such as, for example, an MLP trained using back-propagation techniques or a radial basis function (RBF)

Figure 5:
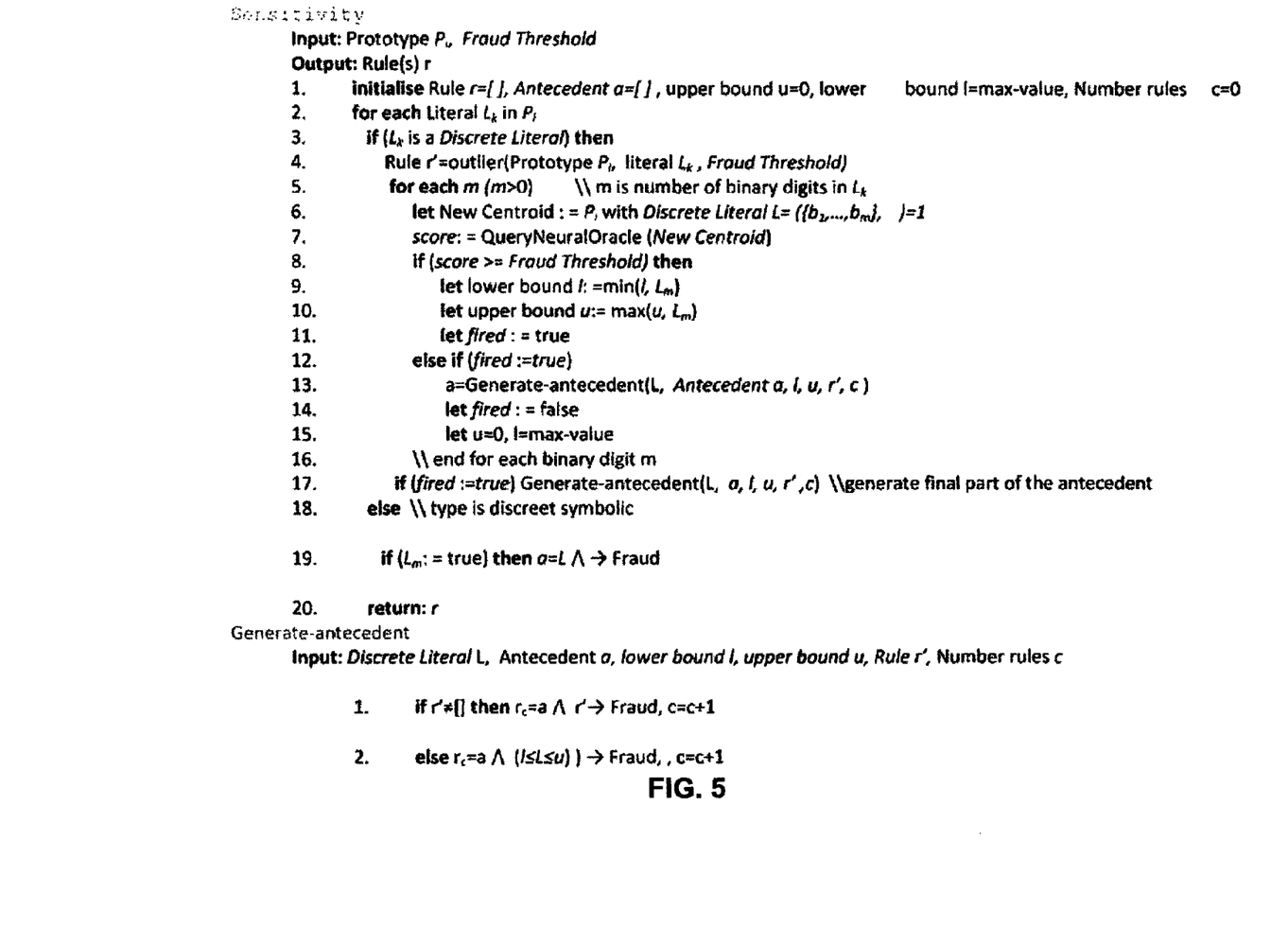
FIG. 5 illustrates one embodiment of an algorithm that expands discrete literals in a prototype transaction.

FIG. 5 illustrates one embodiment of an algorithm that can be used to expand discrete literals in a prototype transaction. In one embodiment, sensitivity analysis is performed for each discrete literal sequentially activating the binary digits in respective discrete literal, e.g., $\{1, 0, \ldots 0\}$, $\{0, 1, \ldots 0\}$ until $\{0, 0, \ldots 1\}$, and classifying the resulting prototype transaction using a classifier oracle, e.g., {fraud, genuine}. In one embodiment, the threshold for fraud is a user-defined value which determines the transaction class based on the output, o, from the classifier oracle [0, 1], such that o≥Fraud Threshold→fraud, o<Fraud Threshold→genuine (e.g., not a Fraud).

Note that in the case of a discretised numeric type, each binary digit represents a contiguous real range and so the search is simplified by only having to activate each binary digit in turn. Only fields that represent continuous values are expanded, since it would make no sense to expand an unordered nominal field. In the illustrated embodiment, expanding a given discrete field creates one or more antecedents, wherein each antecedent comprises single literal L (concept) forming a list of conjunctive literals, and the process of expanding all the fields in the prototype transaction generates a list of antecedents for the set of all discrete fields in the prototype transaction.

Figure 6:
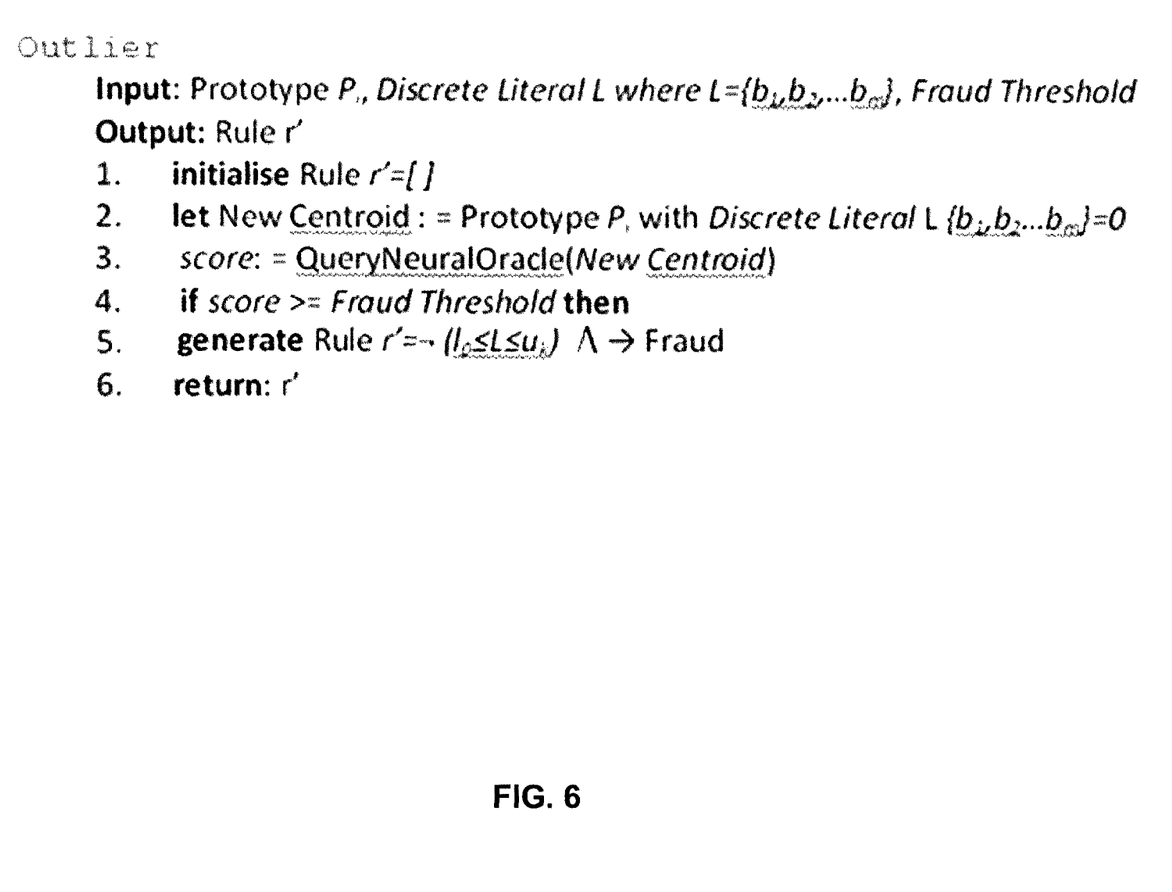
FIG. 6 illustrates one embodiment of an outlier function used by the algorithm of FIG. 5.

Note that if discrete literals in the fraud dataset t were produced by discretising a set of continuously valued literals, the discretisation process can, in some cases, produce a literal where the range $[l_1, u_m]$ does not cover the entire real world range (in the case of outliers, for example). In one embodiment, such cases are encoded as all zeroes $\{b_1, \ldots, b_m\} = 0$. The algorithm of FIG. 5 processes this special case using an "outlier" function. One embodiment of an outlier algorithm is shown in FIG. 6. which implements a rule to the effect that if $\{b_1, \ldots, b_m\} = 0 \rightarrow$ Fraud, then by definition all values outside the range $[l_1, u_m] \rightarrow$ Fraud.

With respect to block 360 of FIG. 3, one or more rules for identifying fraudulent transactions are generated for each prototype transaction using the list of antecedents for the respective transaction. In one embodiment, each rule, $r_n$, comprises a list of discretised literals; $r = \{L_1, L_2, \ldots L_n\} \rightarrow$ Fraud, where $L_n$, denotes a conjunction of literals, i.e., $r = L_1\hat{\,}L_2\hat{\,}L_n \rightarrow$ Fraud. FIG. 5 illustrates one embodiment of an algorithm that, in addition to expanding discrete literals, outputs one or more rules r after all discrete literals in a prototype transaction have been expanded.

With respect to block 370 of FIG. 3, in one embodiment, each rule generated for each of the prototype transactions is added to a rule set R, where, in one embodiment, the rule set R consists of a list of rules; R={$r_1, r_2, \ldots r_n$}, where $r_n$ denotes a disjunction of rules. In one embodiment, the rule set R is optimized by eliminating rules that overlap, for example, by combining or removing discretised field elements (where they may have overlapping real-ranges) and removing those rules that are duplicated.

With respect to block 380 of FIG. 3, in one embodiment, the optimized rule set is pruned to eliminate rules that have a large estimated error and/or rules that never "fire" (i.e., do not select any transactions from the training set). In one embodiment, a false-positive ratio can be determined for each rule using the training dataset, and those rules that have a large ratio (i.e., produce a large number of false-positives compared to the correct number of frauds detected) can be removed.

With respect to block 390 of FIG. 3, in one embodiment, the pruned rule set is then stored on a rule database maintained on computer readable media, such as, for example, the database 230 of FIG. 2. In one embodiment, the stored rule set can be reviewed by interested users, such as fraud analysts, using, for example, a user interface provided by a server having access to the rule database. In one embodiment, the stored rule set can be used by a fraud management system (FMS) for detecting fraudulent payment card transactions in real-time or in batches of previously processed transactions.

Figure 7:
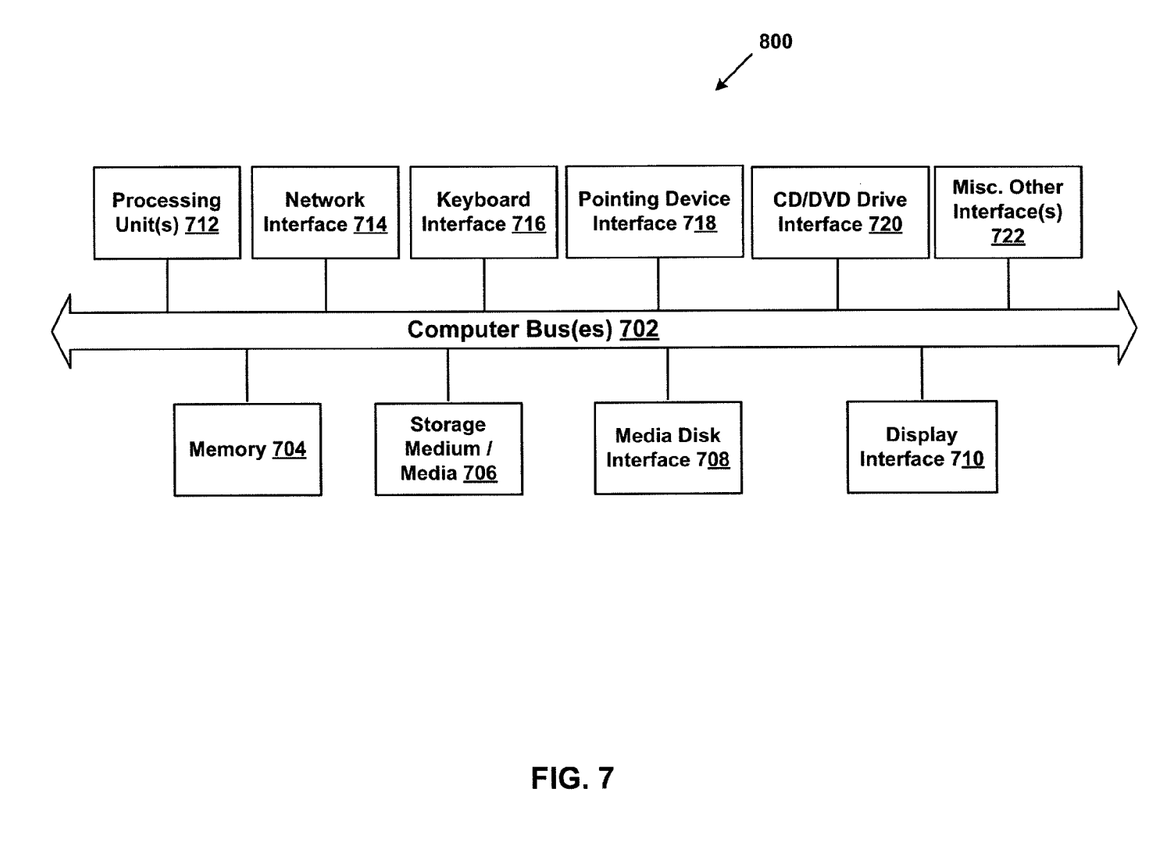
FIG. 7 is a block diagram illustrating an internal architecture of an example of a computing device in accordance with one or more embodiments of the present disclosure.

FIG. 7 is a block diagram illustrating an internal architecture of an example of a computing device which could be used to implement, for example, the rule discovery servers 210 and the fraud management systems 280 of FIG. 1, in accordance with one or more embodiments of the present disclosure. A computing device as referred to herein refers to any device with a processor capable of executing logic or coded instructions, and could be a server, personal computer, set top box, smart phone, pad computer or media device, to name a few such devices. As shown in the example of FIG. 7, internal architecture 710 includes one or more processing units (also referred to herein as CPUs) 712, which interface with at least one computer bus 702. Also interfacing with computer bus 702 are persistent storage medium/media 706, network interface 714, memory 704, e.g., random access memory (RAM), run-time transient memory, read only memory (ROM), etc., media disk drive interface 708 as an interface for a drive that can read and/or write to media including removable media such as floppy, CD-ROM, DVD, etc. media, display interface 710 as an interface for a monitor or other display device, keyboard interface 716 as an interface for a keyboard, pointing device interface 718 as an interface for a mouse or other pointing device, and miscellaneous other interfaces not shown individually, such as parallel and serial port interfaces, a universal serial bus (USB) interface, and the like.

Memory 704 interfaces with computer bus 702 so as to provide information stored in memory 704 to CPU 712 during execution of software programs such as an operating system, application programs, device drivers, and software modules that comprise program code, and/or computer-executable process steps, incorporating functionality described herein, e.g., one or more of process flows described herein. CPU 712 first loads computer-executable process steps from storage, e.g., memory 704, storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage medium/media 706 is a computer readable storage medium(s) that can be used to store software and data, e.g., an operating system and one or more application programs. Persistent storage medium/media 706 can also be used to store device drivers, such as one or more of a digital camera driver, monitor driver, printer driver, scanner driver, or other device drivers, web pages, content files, playlists and other files. Persistent storage medium/media 706 can further include program modules and data files used to implement one or more embodiments of the present disclosure.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:

training, using a computing device, a classifier using a set of transactions, each of the transactions comprising a set of literals, wherein a subset of the literals are literals representing discrete values, and wherein a first subset of the transactions represent a set of fraudulent transactions, and a second subset of the transactions represent a set of genuine transactions, wherein the classifier is trained to classify transactions presented to the classifier in a class selected from a list comprising fraud and genuine;

clustering, using the computing device, the set of transactions on at least one of literals in each of the transactions such that each of the transactions assigned to one of a set of clusters;

generating, using the computing device, a set of prototype transactions, wherein each of the set of clusters is used to generate a prototype transaction such that the respective prototype transaction represents a centroid of all transactions in the cluster;

expanding, using the computing device, the discrete literals in each of the prototype transactions, wherein each expanded literal comprises a conjunction of all values of the respective discrete literal for which the prototype transaction is classified as fraud by the classifier; and generating, using the computing device, for each prototype transaction, a rule comprising a conjunction of the expanded discrete literals in the respective prototype transaction.

2. The method of claim 1 wherein the classifier is a neural network.

3. The method of claim 2 wherein the classifier is trained using Conjugate Gradient Decent techniques.

4. The method of claim 3 wherein the neural network is a multi-layer perceptron.

5. The method of claim 1 wherein generating a rule additionally comprises adding the rule to a rule set, and the method additionally comprises:
  optimizing, using the computing device, the rule set by removing rules from the rule set that overlap, and removing rules from the rule set that are duplicated within the rule set.

6. The method of claim 5 wherein the method additionally comprises
  pruning, using the computing device, the rule set by removing rules that do not select any transactions from the set of a transactions.

7. The method of claim 6 wherein pruning additionally comprises
  determining a false-positive ratio for each rule in the rule set using the set of transactions; and
  removing rules from the rule set that have a false-positive ratio that exceeds a predetermined threshold.

8. The method of claim 7 additionally comprising:
  storing, using the computing device, the rule set to a computer-readable medium.

9. The method of claim 1 wherein clustering comprises clustering the set of fraudulent transactions such that each of the set of fraudulent transactions is assigned to one of a set of clusters wherein each of the transactions assigned to a specific cluster is within a threshold Euclidean distance of all other transactions assigned to the specific cluster.

10. The method of claim 9 wherein if one of the set of fraudulent transactions is not within the threshold Euclidean distance of all other transactions assigned to any of the set of clusters, a new cluster comprising the one of the set of fraudulent transactions is added to the set of clusters.

11. The method of claim 1 wherein expanding each of the discrete literals in each of the prototype transactions comprises performing a sensitivity analysis for the respective discrete literal, the sensitivity analysis comprising:
  for each binary digit in the respective discrete literal,
    creating a test literal such that the value of the test literal is set to a discrete value equal to a value produced by setting the respective binary digit in the respective discrete literal to 1, and setting the remaining binary digits in the respective discrete literal to 0, and
    interrogating the classifier, using the respective prototype transaction and the respective test literal, wherein the test literal is used in place of the respective discrete literal, such that the prototype transaction is classified in a class selected from the list comprising fraud and genuine; and
  generating, for the respective discrete literal, an expanded discrete literal, the expanded discrete literal comprising a conjunction of all values of the test literal for which the prototype transaction was classified as fraud.

12. The method of claim 1 wherein the set of transactions is produced by a method comprising:
  selecting, using the computing device, a set of transactions, each of the unnormalized transactions comprising a set of literals, wherein a subset of the literals are literals representing continuous values; and
  generating, using the computing device, the set of transactions from the set of transactions, wherein each of the subset of literals representing continuous values in each of the unnormalized transactions is transformed to a discrete literal, such that each discrete literal is assigned one of a set of discrete values, each discrete value corresponding to a one of a set of ranges, each respective range corresponding to a range of continuous values.

13. The method of claim 1 wherein the set of ranges is generated using a method comprising:
  clustering, using the computing device, each continuous literal in the set of transactions, wherein each of the transactions assigned to a one of a set of literal value clusters wherein each of the transactions assigned to a specific literal value cluster is within a threshold Euclidean distance of all other transactions assigned to the specific literal value cluster; and
  generating, using the computing device, the set of ranges using the set of literal value clusters, wherein a range is generated for each of the set of literal value clusters such that a center of each literal value cluster is used to define the start of the respective range.

14. The method of claim 12 wherein if a literal representing a continuous value in an transaction has a value that does not fall within any of the set of ranges, the respective discrete literal is coded as an outlier.

15. The method of claim 14 wherein a discrete literal coded as an outlier is assigned a value of binary zeroes.

16. A non-transitory computer-readable storage medium for tangibly storing thereon computer readable instructions for a method comprising:
  training a classifier using a set of transactions, each of the transactions comprising a set of literals, wherein a subset of the literals are literals representing discrete values, and wherein a first subset of the transactions represent a set of fraudulent transactions, and a second subset of the transactions represent a set of genuine transactions, wherein the classifier is trained to classify transactions presented to the classifier in a class selected from a list comprising fraud and genuine;
  clustering, using the computing device, the set of transactions on at least one of literals in each of the transactions such that each of the transactions assigned to one of a set of clusters;
  generating a set of prototype transactions, wherein each of the set of clusters is used to generate a prototype transaction such that the respective prototype transaction represents a centroid of all transactions in the cluster;
  expanding the discrete literals in each of the prototype transactions, wherein each expanded literal comprises a conjunction of all values of the respective discrete literal for which the prototype transaction is classified as fraud by the classifier; and
  generating, for each prototype transaction, a rule comprising a conjunction of the expanded discrete literals in the respective prototype transaction.

17. A computing device comprising:
  a processor and a memory;
  a storage medium for tangibly storing thereon program logic for execution by the processor, the program logic comprising logic for:
    training a classifier using a set of transactions, each of the transactions comprising a set of literals, wherein a subset of the literals are literals representing discrete values, and wherein a first subset of the transactions represent a set of fraudulent transactions, and a second subset of the transactions represent a set of genuine transactions, wherein the classifier is trained to classify transactions presented to the classifier in a class selected from a list comprising fraud and genuine;

clustering the set of transactions on at least one of literals in each of the transactions such that each of the transactions assigned to one of a set of clusters;

generating a set of prototype transactions, wherein each of the set of clusters is used to generate a prototype transaction such that the respective prototype transaction represents a centroid of all transactions in the cluster;

expanding the discrete literals in each of the prototype transactions, wherein each expanded literal comprises a conjunction of all values of the respective discrete literal for which the prototype transaction is classified as fraud by the classifier; and generating, for each prototype transaction, a rule comprising a conjunction of the expanded discrete literals in the respective prototype transaction.

18. A method comprising:

selecting, using a computing device, a set of transactions, each of the transactions comprising a set of literals, wherein a subset of the literals are literals representing continuous values, and wherein a subset of the transactions represent a set of fraudulent transactions;

normalizing, using the computing device, the set of transactions, such that the each of the subset of literals for each of the transactions is transformed to a discrete literal, wherein each discrete literal is assigned one of a set of discrete values, each discrete value corresponding to a range of continuous values;

training, using a computing device, a classifier using a set of transactions, each of the transactions comprising a set of literals, wherein a subset of the literals are literals representing discrete values, and wherein a first subset of the transactions represent a set of fraudulent transactions, and a second subset of the transactions represent a set of genuine transactions, wherein the classifier is trained to classify transactions presented to the classifier in a class selected from a list comprising fraud and genuine;

clustering, using the computing device, the set of fraudulent transactions, such that each of the set of fraudulent transactions is assigned to one of a set of clusters such that each of the transactions assigned to a specific cluster is within a threshold Euclidean distance of all other transactions assigned to the specific cluster;

generating, using the computing device, a set of prototype transactions, wherein each of the set of clusters is used to generate a prototype transaction such that the prototype transaction represents the centroid of all transactions in the cluster;

expanding, using the computing device, the discrete literals in each of the prototype transactions, wherein for each discrete literal in each prototype transaction, a sensitivity analysis is performed, the sensitivity analysis comprising:

for each binary digit in the respective discrete literal, creating a test literal such that the value of the test literal is set to a discrete value equal to a value produced by setting the respective binary digit in the respective discrete literal to 1, and setting the remaining binary digits in the respective discrete literal to 0, and interrogating the classifier, using the respective prototype transaction and the respective test literal, wherein the test literal is used in place of the respective discrete literal, such that the prototype transaction is classified in a class selected from the list comprising fraud and genuine;

generating, for the respective discrete literal, at least one antecedent, the at least one antecedent comprising a conjunction of all values of the test literal for which the prototype transaction was classified as fraud;

adding the at least one antecedent to a list of antecedents for the prototype transaction; and generating, using the computing device, for each prototype transaction, a rule using the respective list of antecedents for the respective prototype transaction, the at least one rule comprising a conjunction of the expanded discrete literals in the respective prototype transaction.

* * * * *